United States Patent [19]

Anderson et al.

[11] Patent Number: 4,501,440
[45] Date of Patent: Feb. 26, 1985

[54] INSULATED TUBING JOINT

[75] Inventors: David M. Anderson, Whittier; Yung J. Kim, Hacienda Heights, both of Calif.

[73] Assignee: Baker Oil Tools, Inc., Orange, Calif.

[21] Appl. No.: 458,417

[22] Filed: Jan. 17, 1983

[51] Int. Cl.³ .......................... F16L 59/14; F16L 9/22
[52] U.S. Cl. ..................................... 285/47; 138/149; 285/371
[58] Field of Search ..................... 285/47, DIG. 5, 53; 138/149, 109

[56] References Cited

U.S. PATENT DOCUMENTS

| | | | |
|---|---|---|---|
| 3,369,826 | 2/1968 | Boosey et al. | 138/149 X |
| 3,432,186 | 3/1969 | Braun | 285/53 |
| 4,019,761 | 4/1977 | Heidemann | 285/47 |
| 4,036,618 | 7/1977 | Leonard | 285/DIG. 5 X |

Primary Examiner—Cornelius J. Husar
Assistant Examiner—Eric S. Katz
Attorney, Agent, or Firm—Norvell & Associates

[57] ABSTRACT

A concentric insulating tubular conduit string, including one or more joints with concentric tubular members is disclosed. A concentric walled joint of the type disclosed herein is especially adapted to form a separation joint when incorporated in the tubular string. An insulating conduit incorporating one or more integral separation joints of the type disclosed could be employed for the delivery of a heated fluid, such as steam, through the conduit to the producing formation therebelow. The inner and outer tubular members of the separation joint may be prestressed in tension and compression between axially spaced coupling members used to join the separation joint to the rest of the tubular conduit. A hermetically sealed annular insulating cavity is formed between the inner and outer tubular members. This joint can be separated by merely severing the tensile loaded tubular member and upon severance of this separation joint the conduit extending thereabove can be removed from a subterranean well.

10 Claims, 6 Drawing Figures

INSULATED TUBING JOINT

BACKGROUND OF THE INVENTION

1. Field of the Invention

This invention generally relates to conduits for use in subterranean wells where provision must be made for the severance of the conduit at a predetermined position and, more particularly, to concentric wall insulated tubing conduits and separation joints for these concentric wall conduits which are used to convey a heated fluid, such as steam, into the subterranean well.

2. Description of the Prior Art

It is often necessary to provide a means for severing a tubing string in a subterranean well at a predetermined location. Perhaps the most common situation in which separation of the tubing string at a precise location is necessary is the use of shear-out safety joints in tubing strings employing a safety valve. In such cases it may be necessary to sever the tubing string above the safety valve during an emergency. Shear-out safety joints are incorporated above safety valves so that in case of a disaster at the well head, the tubing string will separate above the safety valve permitting the safety valve to shut off the well.

The concentric tubing joint comprising the preferred embodiment of this invention can be used to provide a means of separating the tubing string at a desired location, especially when used in concentric walled insulating tubing string. In producing some subterranean wells, it is necessary to inject steam into an injection or producing well to increase the recovery of hydrocarbons by reducing the viscosity of the crude oil in the formation. One of the major problems in injecting steam into a subterranean production zone is that the heat transfer between the surface and the production zone is excessive when conventional well production tubing is utilized. Dual wall tubing structures having insulating material in the annulus between inner and outer walls welded at either end have been employed to reduce this heat loss. In U.S. Pat. No. 3,511,282 and in U.S. patent application Ser. No. 272,411, filed June 10, 1981 now U.S. Pat. No. 4,396,211, the inner wall of a concentric walled insulated tubing section is prestressed in tension to relieve the stresses in the tubular sections when heated steam is injected. The exterior walls of these concentric walled tubing sections are conversely prestressed in compression. In each of these tubular conduit members, means are provided for rigidly attaching the inner wall to the outer wall at opposite ends of the tubing. The conventional means of providing this rigid attachment is to weld the inner tubular ember to a bushing extending between the inner tubular member and the outer tubular member. In U.S. patent application Ser. No. 272,411, filed June 10, 1981, the inner tubing is flared so that a single weld may be employed to attach the inner conduit to the outer conduit at either end. Another dual wall conduit which employs a flexible bellows to permit differential expansion between the inner and outer tubular members is disclosed in U.S. Pat. No. 4,332,401. This dual wall device does not employ a tensile prestressed inner member with a compression prestressed outer member. Despite the structural differences between these separate concentric tubular conduit assemblies, it is quite apparent that each comprises a more complex and expensive structure than conventional oil well tubing. It is, therefore, more desirable that these tubular conduits and the welds incorporated therein not be damaged during operation.

The separation joint comprising the preferred embodiment of this invention therefore comprises a beneficial means for separating the tubing without risking damage to the more expensive insulated conduit. Perhaps the most common application of this separation joint would be its use in conjunction with the connection of insulated tubular conduit to a downhole packer. If for some reason a conventional packer employed in conjunction with an insulated tubular string cannot be released to permit retrieval of the tubular string, this separation joint would provide a means of releasing the tubing from the packer lodged in the well.

A separation joint intended for a similar purpose, but without the hermetically sealed annulus disclosed herein, is also disclosed in co-pending U.S. patent application Ser. No. 305,827 filed Sept. 28, 1981 now U.S. Pat. No. 4,423,778.

SUMMARY OF THE INVENTION

A concentric walled tubular member incorporable in a tubing string used in a subterranean well comprises first and second concentric tubing members extending between axially spaced interior coupling members which are in turn joined by exterior coupling member to form a tubular string. The inner tubular member is joined to upper and lower interior coupling members and may be prestressed in tension. A second outer tubular member is affixed to a first coupling member and abuts or engages the second coupling member so that only compressive loads are carried by the second tubular member. A flexible metal seal is attached to both the second coupling member and the outer tubular member to hermetically seal the annular insulating cavity between the tubular members. The annular cavity is filled with insulating material. A tubular member fabricated in accordance with this invention can be incorporated as a separation joint between other joints in an insulating tubular conduit having inner and outer prestressed rigidly attached tubular members and an anchoring device such as a packer. This separation joint permits severance of the tubing string and retrieval of the string while the anchored device remains in place.

DESCRIPTION OF THE PREFERRED EMBODIMENT

The concentric walled tubular joint or section depicted herein is especially adapted for use as a separation joint with concentric walled prestressed insulating tubing. Joints or sections comprise individual tubular components which may be joined to form a tubular string such as an interior production string extending into a subterranean well having an exterior casing. It should be noted, however, that this separation joint is not limited to use with insulated tubing and can be employed with other more conventional tubing strings.

The separation joint comprising the preferred embodiment of this invention can be employed wherever separation of the tubing at a particular location is desired. This separation joint is specifically adapted to permit separation after severance of the concentric wall member in the separation joint subjected to prestress tensile loads.

Figure 1:
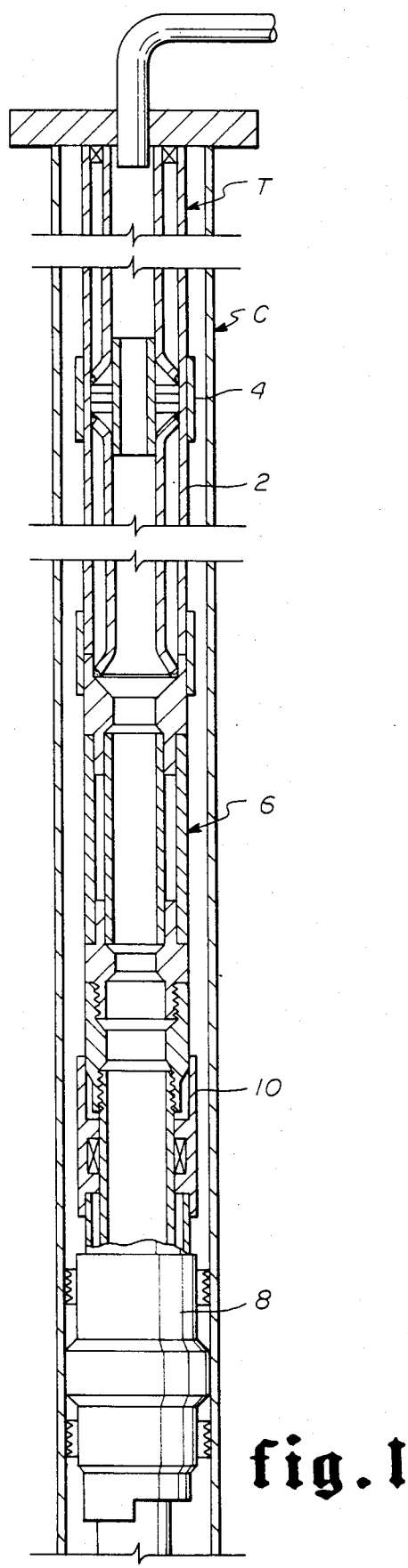
FIG. 1 is a schematic view illustrating a separation joint employed with insulated tubing and a packer.

As shown in FIG. 1, an insulating tubing string T inserted within an outer casing C may be effectively used to permit the injection of steam or some other heated liquid through the tubing T to a producing formation containing viscous fluids which cannot be produced in the absence of some treatment. A conventional packer 8 has been employed to seal the annulus between casing C and tubing T and to anchor the tubing string T at its lower end adjacent the formation. The tubing string T can comprise a plurality of individual insulating tubing sections 2, each attached to the other by means of a standard connection member 4. In the schematic view of FIG. 1, a separation joint 6 has been employed between the lowermost tubing section 2 and packer 8. It should be appreciated, however, that a separation joint 6 can be employed at any location within the tubing string where separation of the tubing string would be desirable.

Figure 2A:
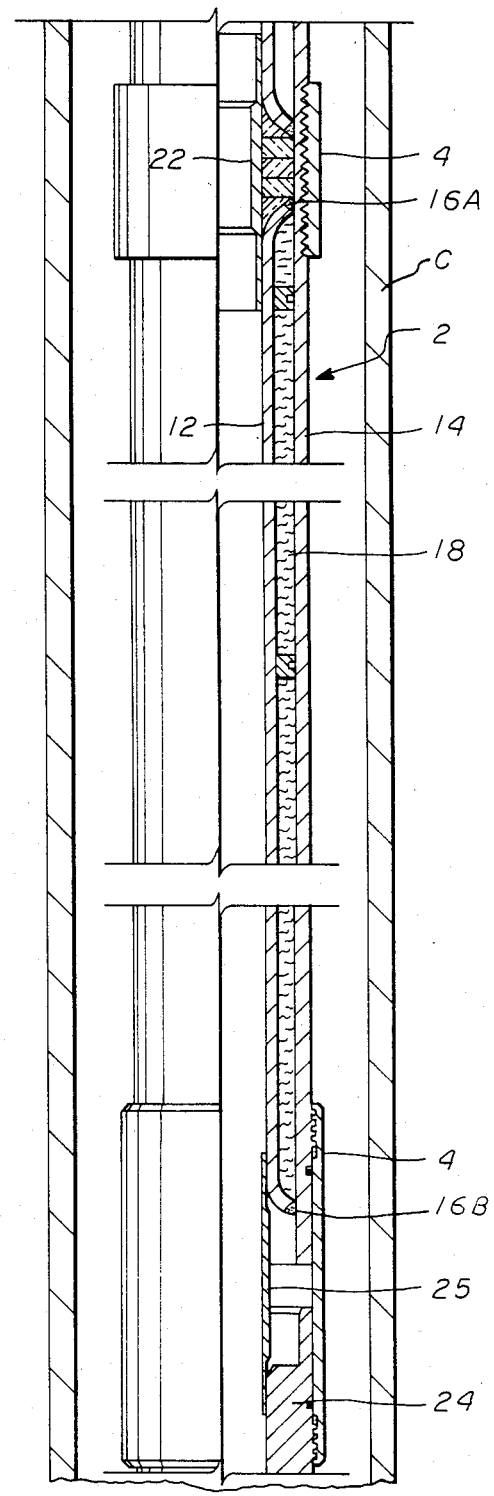
FIGS. 2A–2C are running continuations illustrating the detailed construction of the separation joint and typical insulating tubing and packer with which this separation joint may be employed.

As shown more explictly in FIG. 2A, the insulating tubing sections 2, with which separation joint 6 may be employed, comprise a concentric wall insulating member having an inner tubular member 12 and an outer tubular member 14. Each separate insulating tubing section 2 is formed by attaching the inner tubular member 12 directly to the outer tubular member 14 by means of two welds 16A and 16B. In the embodiment shown in this invention, each insulating tubing string employs curved or flared ends 20 adjacent each end of inner tubing member 12 to facilitate effective attachment of inner tubular member 12 to outer tubular member 14. It should be noted that the separation joint 6 employed in the preferred embodiment of this invention can be used with insulating tubing sections of somewhat different construction or with conventional tubing, and the separation joint 6 will perform its desired function in the same manner. Each insulating tubing section 2 also employs conventional insulating material 18 in the annular cavity formed between inner and outer tubular members 12 and 14. Adjacent sections of insulating tubing T are joined by conventional external connection members 4 which engage threads at the ends of outer tubular member 12. Inner connecting members 22 extend between adjacent inner tubular members 12 and together with insulation extending around the periphery of inner connecting member 22, appropriate heat transfer characteristics are maintained at each joint of the insulating tubing section.

Figure 2B:
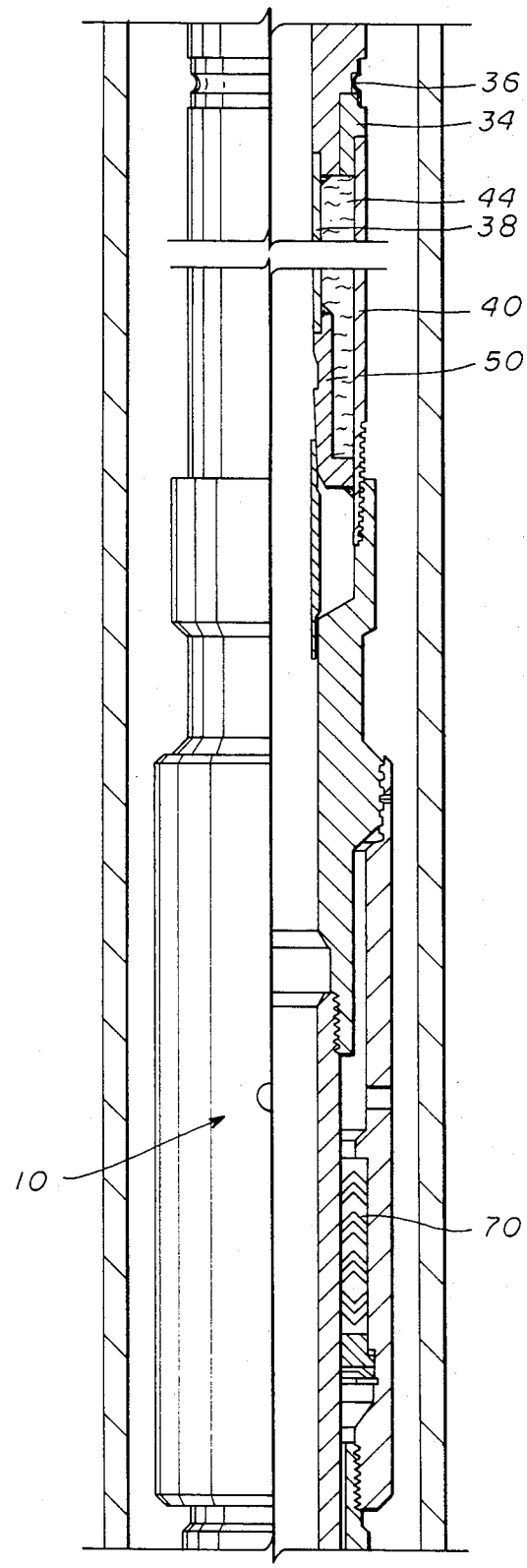

When it is desired to incorporate a separation joint 6 within the tubing string T, separation joint 6 may be attached to the end of an insulating tubing section 2 by means of a conventional external coupling member 4. As shown in FIGS. 2A and 2B, exterior coupling member 4 engages the threads 26 along the outer end of the first or upper interior coupling member 24. Coupling member 24 comprises a cylindrical member having a central section 28 with a relatively greater thickness than the upper and lower extremities of each coupling member 24. An inclined surface 30 extends around the inner bore of coupling member 24 for engagement with an interior sleeve insert 25 extending between adjacent tubular joints. A lower section 29 of interior coupling member 24 is formed by a stepped surface 31 on the outer lower portion of interior coupling member 24. A ring member 34 is dimensioned to be received within stepped surface 31 and abuts downwardly facing shoulder 33. A flexible metallic membrane seal 36 is welded to interior coupling 24 and to ring member 34. A second stepped surface 35 is located on the lower inner edge of interior coupling 24. Separation joint 6 further comprises first and second tubular members or sleeves 38 and 40 engaging interior coupling member 24 along stepped surfaces 35 and 31 respectively. First and second tubular members 38 and 40 comprise a concentric wall construction extending axially in separation joint 6. An annular cavity 44 is provided between first and second tubular members 38 and 40 in the preferred embodiment of this invention.

Insulating material is inserted into annular cavity 44 to reduce the heat transfer through the separation joint. A blanket type insulation composed of mechanically bonded refractory fibers of the type manufactured by Johns-Manville under the trademarks "THERMO-MAT" or "CERATEX" may be employed to provide a convective insulating barrier. Lower coupling member 50 in the preferred embodiment of this invention differs from upper coupling member 24. Interior coupling member 58 has an upper section 52 with a smaller external diameter than lower section 54. An inner stepped surface 56 along the inner periphery of lower interior coupling 50 receives the lower end of inner tubular member 38. A notch 58 with an upwardly facing shoulder 59 is located along the inner periphery of coupling section 52. It should be understood that the orientation of the separation joint 6 can be reversed without affecting its operation.

The preferred embodiment of concentric wall insulating conduit section or joint 6 is fabricated by initially welding the inner tubular member to the upper interior coupling 24 at 60a and to the lower interior coupling 50 at 60f, to form sealed interconnections, inner member 38 is thus rigidly attached to both interior coupling members 24 and 50. Ring 34 to which metal seal 36 has been welded can be inserted on inner coupling 24 within stepped surface 31 either prior to or after inner tubular member 38 is welded to upper inner coupling 24. The opposite end of seal 36 can then be welded to inner coupling member 24. After inner coupling members 24 and 50 have been welded to inner tubular member 38, suitable insulating material is positioned between the inner coupling members to surround inner tubular member 38. This insulation can comprise conventional material for preventing convective, conductive and radiant heat transfer. In the preferred embodiment of this invention it is desirable to prestress the inner tubular member to reduce the stresses under the anticipated elevated operational temperature. This tensile prestress is established by first moving outer tubular member 40 into surrounding relationship to the inner tubular assembly with the upper end of member 40 abutting downwardly facing shoulder 37 on the lower periphery of ring member 34. A suitable tool is then attached to notch 58 on the lower inner coupling member 50 and a tensile load is applied to inner tubular 38. Of course a compressive load will be simultaneously applied to outer tubular member 40. When the desired prestress has been established, the outer tubular member is welded to the lower inner coupling 50. The outer tubular member 40 can then be welded to ring member 34. Welds 60a–60f completely seal annular cavity 44 to prevent deterioration of the insulating material to maintain the insulating performance of the concentric conduit during its operation. The outer tubular member is not rigidly attached to the inner tubular member 38 or to upper inner coupling member 24. A small tensile load applied between coupling 24 and outer tubular member 40 will rupture flexible seal 36. Under normal operating conditions inner member 38 would carry tensile loads and the flexible seal would not be subjected to loads sufficient to rupture it. The curvature of the seal will, however, provide some flexibility in case of slight movement of the members welded to the seal. When the inner tubular member is severed, the flexible seal will break under applied tensile loads when the conduit above the separation joint is removed.

Figure 2C:
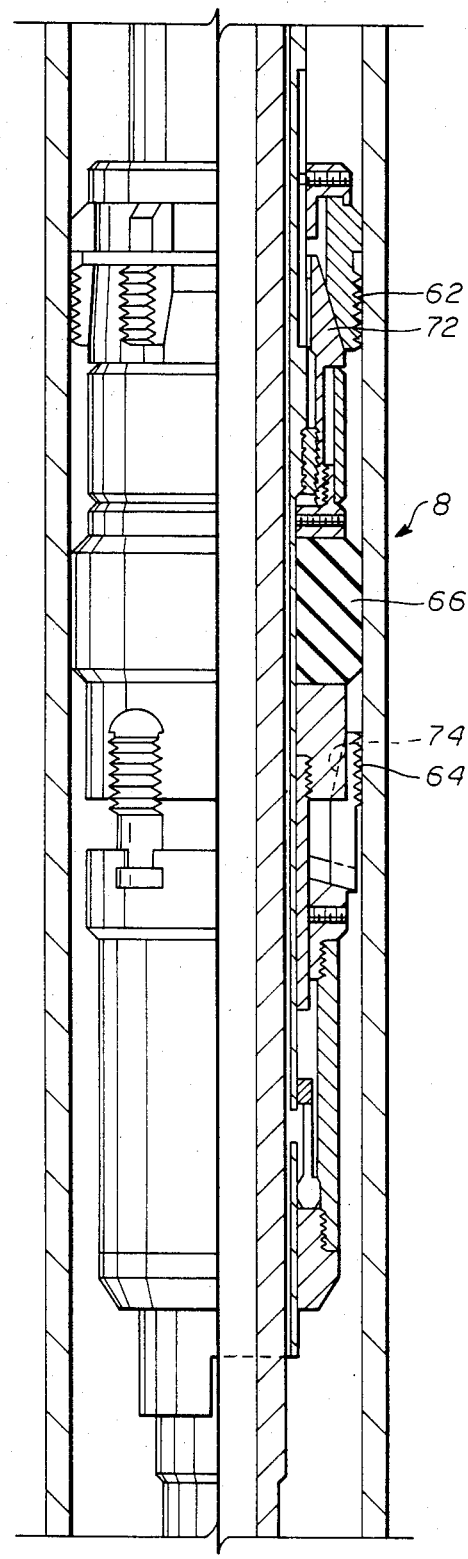
Figure 3A:
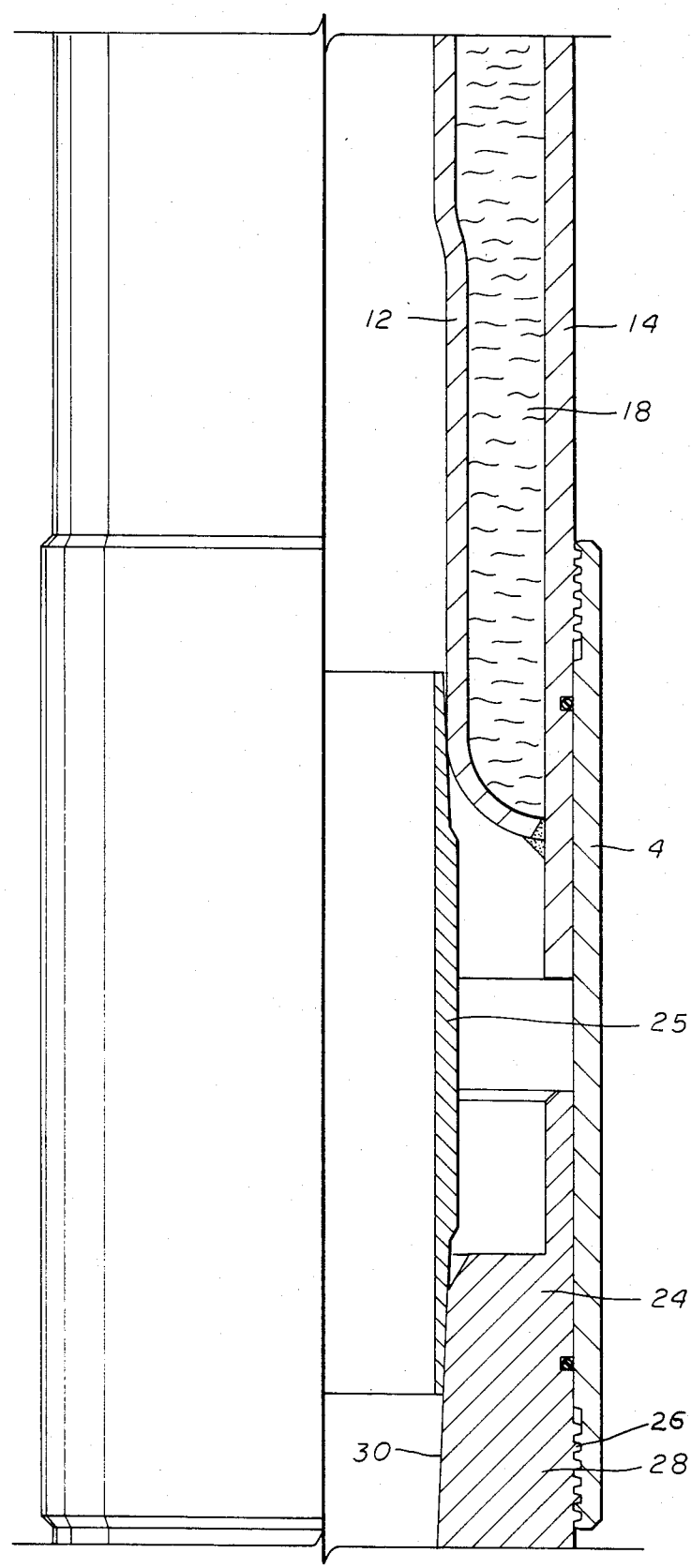
FIGS. 3A and 3B are views of the preferred embodiment of the tubular conduit which can be used as a separation joint in a tubular string.
Figure 3B:
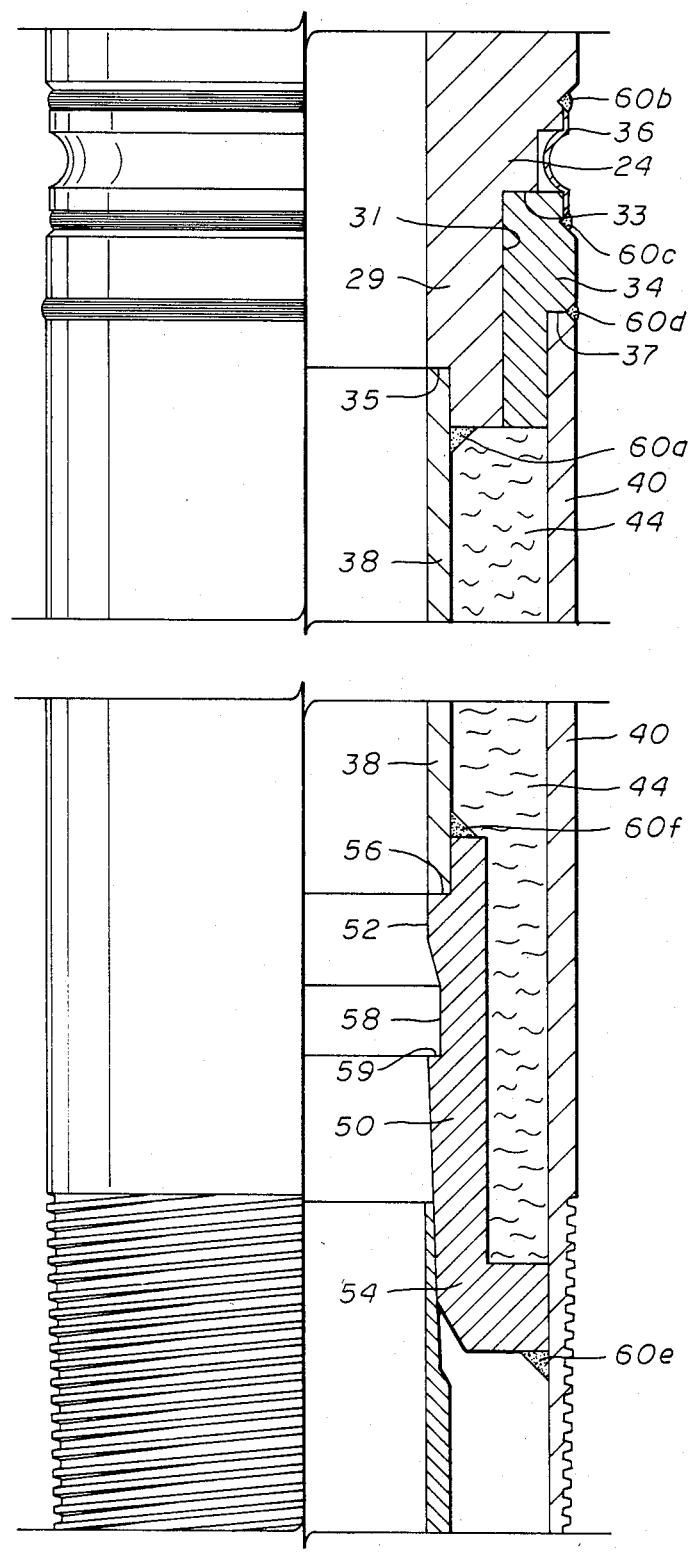

When used with concentric insulated tubing, separation joint 6 will normally be attached to the upper end of a packer 8 which may incorporate an integral expansion joint 10. Packer 8 serves to isolate the annulus between the tubing and the casing and radially expandable upper and lower slips 62 and 64 serve as anchoring means to engage the outer casing and to secure the packer and tubing string to the outer casing. Packing element 66 establishes sealing integrity between the packer and the outer casing and isolates the annulus above the packer from the annulus below. Any number of conventional packers may be employed with the assembly shown in the preferred embodiment of this invention. The packer 8 depicted in FIG. 2C is, however, specifically adapted for use in high temperature environments in which insulated tubing of the type depicted herein will be necessary. This packer employs an integral expansion joint 10 mounted above the slips 62 and 64 and packing elements 66. This expansion joint employs an inner mandrel member 68 which engages seals 70 located on the outer housing 71 of the expansion joint. This packer is set in a conventional manner by applying tension to the tubing string. This tension is transmitted through the packer to cause upper slip cones 72 to move beneath upper slips 62 causing them to move radially outward into engagement with the casing. Lower slips 64 also move relative to cooperating conical surfaces 74 to cause the lower slips 64 to also engage the casing. Tension applied to the tubing string also results in relative movement of the packer resulting in compression and radial expansion of packing elements 66. Packer 8 may be released by applying additional tension to the tubing string to disengage upper and lower slips 62 and 64 from upper and lower cones 72 and 74.

Although use of the specific packer shown in FIG. 2C is not essential to the function of this invention, it should be clear that separation joint 6 not only provides a means of separating the tubing string at a desired point but it also permits the transmission of tensile forces through the tubing string to a packer located therebelow. Separation joint 6 can be incorporated into the tubing string in a conventional manner with the threads on the exterior of upper interior coupling member 24 or on the lower end of the outer tubular member 40 being adapted to engage conventional exterior coupling members 4. Separation joint 6 becomes critical when a packer, such as packer 8 shown in FIG. 2C, cannot be released in a conventional manner. It is therefore necessary to separate the tubing string from the anchored packer to salvage the tubing string. Separation joint 6 provides a convenient means for separating the tubing string above joint 6 from the tubing and packer extending therebelow. A suitable cutting means, such as a conventional chemical cutter, can be inserted into the well to cut one of the two concentric tubular members in separation joint 6. In the embodiment shown herein, the cutting means inserted through the tubing string permitting internal cutting can be used to cut inner tubular member 38. In this preferred embodiment, outer tubular member 40 is not rigidly attached to upper internal coupling 24, but it will continue to support the tubing string thereabove under compressive loads after the inner tubular member is severed. After the inner tubular member has been cut, the outer tubular member can be separated from the upper interior coupling 24 by merely picking up on the tubing string. Since the flexible metallic membrane seal is substantially thinner than the tubular members comprising the joint, the seal 36 will not support the tensile loads easily applied by picking up the tubing after member 38 is severed.

Although the invention has been described in terms of the specified embodiment which is set forth in detail, it should be understood that this is by illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A concentric wall insulating tubular joint incorporable in a tubular conduit string for use in transporting a heated fluid in a subterranean well, comprising:
   a first tubular member;
   a second concentric tubular member, the second tubular member being prestressed in tension and the first tubular member being prestressed in compression;
   first and second interior coupling members between, on opposite ends of and affixed to the first and second tubular members;
   an annular insulating cavity defined between the spaced apart first and second tubular members and extending between the first and second coupling members; and
   at least one membrane seal extending between one of the tubular members and one of the interior coupling members, the annular insulating cavity being sealed at the juncture of each tubular member and each interior coupling member.

2. A concentric wall insulating tubular joint incorporable in a tubular conduit string for use in transporting a heated fluid in a subterranean well, comprising;
   a first tubular member;
   a second concentric tubular member, the second tubular member being prestressed in tension and the first tubular member being prestressed in compression;
   first and second interior coupling members between and on opposite ends of the first and second tubular member, the second tubular member being attached to both the first and second interior coupling members by sealing interconnections, tensile loads applied to the tubular conduit string being transmitted through the first interior coupling member to the second prestressed in tension tubular member to the second interior coupling member, the second tubular member being affixed to the second interior coupling member by a sealing interconnection and abutting the first interior coupling member, the first interior coupling member being subjected to compressive loads applied by the second tubular member;

an annular insulating cavity defined between the spaced apart first and second tubular members and extending between the first and second interior coupling members; and a membrane seal extending between the second tubular member and the first interior coupling member, the annular insulating cavity being sealed by three sealing connections affixing the tubular members to interior coupling members and by the membrane seal.

3. The tubular joint as set forth in claim 2 wherein the sealing interconnections comprise welded connections.

4. The tubular joint as set forth in claim 3 wherein the membrane seal is welded to the first coupling member and the second tubular member.

5. The tubular joint as set forth in claim 4 wherein the first tubular member extends concentrically within and spaced from the outer second tubular member.

6. The tubular joint of claim 5 further comprising a ring member between the membrane seal and the outer tubular member, the ring insert abutting the first interior coupling member and the outer tubular member.

7. The tubular conduit of claim 6 further comprising exterior threaded connection means on the outer periphery of the first interior coupling member and on the outer periphery of the outer tubular member adjacent the second interior coupling member.

8. The tubular conduit of claim 7 wherein said membrane is thinner than the outer tubular member, the membrane being incapable of withstanding significant tensile loads in comparison to tensile loads applied to the inner tubular member.

9. A concentric wall insulating tubular separation joint incorporable in a tubular conduit string for use in transporting a heated fluid in a subterranean well, and for establishing a predetermined separation point in the tubing string, comprising:

an outer tubular member;

an inner concentric tubular member, the inner member being prestressed in tension and the outer tubular member being prestressed in compression;

first and second interior coupling members between and on opposite ends of the inner and outer tubular members, the inner tubular member being attached to both the first and second interior coupling members by sealing interconnections, tensile loads applied to the tubular conduit being carried by the first and second interior couplings and the inner prestressed in tension tubular member, the outer prestressed in compression tubular member abutting the first interior coupling member;

an annular insulating cavity defined between the spaced apart, inner and outer tubular members and extending between the first and second interior coupling members; and a membrane seal comprising the only interconnection between the abutting outer tubular member and first interior coupling member, the membrane seal being thinner than the outer tubular member, the membrane being incapable of withstanding significant tensile loads in comparision to tensile loads applied to the inner tubular member whereby the dual walled conduit can be separated by severing only the inner tubular member in the separation joint.

10. The separation joint of claim 9 wherein said sealed interconnections comprise welded interconnections and said membrane seal is welded between the outer tubular member and the first interior coupling member.

* * * * *